United States Patent
Harris et al.

(10) Patent No.: US 7,795,763 B2
(45) Date of Patent: Sep. 14, 2010

(54) ELECTROMAGNETIC DEVICE FOR CONVERTING MECHANICAL VIBRATIONAL ENERGY INTO ELECTRICAL ENERGY

(75) Inventors: Nicholas Robert Harris, Camberley (GB); Michael John Tudor, Southsea (GB); Neil Maurice White, West End (GB); Stephen Paul Beeby, Bishops Waltham (GB)

(73) Assignee: University of Southampton, Hampshire (GB)

( * ) Notice: Subject to any disclaimer, the term of this patent is extended or adjusted under 35 U.S.C. 154(b) by 645 days.

(21) Appl. No.: 10/599,338

(22) PCT Filed: Mar. 23, 2005

(86) PCT No.: PCT/GB2005/001094

§ 371 (c)(1),
(2), (4) Date: Nov. 7, 2006

(87) PCT Pub. No.: WO2005/093931

PCT Pub. Date: Oct. 6, 2005

(65) Prior Publication Data

US 2008/0246346 A1    Oct. 9, 2008

(30) Foreign Application Priority Data

Mar. 26, 2004 (GB) ................................. 0406861.5

(51) Int. Cl.
*H02K 35/04* (2006.01)
(52) U.S. Cl. ........................ 310/12.16; 310/15; 310/28; 310/30; 290/1 R; 336/110

(58) Field of Classification Search .............. 310/36–39, 310/330–332, 339, 12.16, 15, 28, 30; 290/1 R, 290/4 B, 53–54; 324/173–174, 76.49; 336/110; 181/0.5; 73/35.09, 651; 331/154; 318/114
See application file for complete search history.

(56) References Cited

U.S. PATENT DOCUMENTS 3,320,738 A * 5/1967 Sparing et al. .............. 368/160

(Continued)

FOREIGN PATENT DOCUMENTS

DE    4338103 A1    5/1995

(Continued)

OTHER PUBLICATIONS

Beeby, S.P.; Tudor, M.J.; Koukharenko, E.; White, N.M.; O'Donnell, T.; Saha, C.; Kulkarni, S.; Roy, S.; "Design and performance of a microelectromagnetic vibration powered generator" Solid-State Sensors, Actuators and Microsystems, 2005. Digest of Technical Papers. Transducers '05. The 13th International Conference on vol. 1,5-9.*

(Continued)

*Primary Examiner*—Burton Mullins
(74) *Attorney, Agent, or Firm*—Carstens & Cahoon LLP

(57) ABSTRACT

An electromagnetic generator comprising two magnets and a coil disposed therebetween, the two magnets being configured to define therebetween a region of magnetic flux in which the coil is disposed whereby relative movement between the coil and the magnets generates an electrical current in the coil, and a vibratable first mount for each of the magnets and a vibratable second mount for the coil whereby each of the at least two magnets and the coil are respectively vibratable about a respective central position.

8 Claims, 5 Drawing Sheets

U.S. PATENT DOCUMENTS

| | | | | |
|---|---|---|---|---|
| 3,525,887 | A | * | 8/1970 | Ewart, Jr. .................... 310/27 |
| 3,581,129 | A | * | 5/1971 | Ganter et al. ................ 310/25 |
| 3,895,244 | A | * | 7/1975 | Link .......................... 310/15 |
| 4,175,461 | A | * | 11/1979 | Nagata et al. ................ 84/729 |
| 4,225,862 | A | * | 9/1980 | Johnson ...................... 345/31 |
| 4,448,059 | A | * | 5/1984 | Kondo et al. ............... 73/35.09 |
| 4,806,859 | A | * | 2/1989 | Hetrick .................. 324/207.15 |
| 5,193,391 | A | * | 3/1993 | Cage ...................... 73/504.15 |
| 5,347,186 | A | * | 9/1994 | Konotchick ................. 310/17 |
| 5,578,877 | A | * | 11/1996 | Tiemann ...................... 310/15 |
| 6,404,085 | B2 | * | 6/2002 | Hamaguchi et al. ........... 310/81 |
| 6,563,238 | B1 | * | 5/2003 | Lee et al. ..................... 310/15 |
| 6,772,592 | B2 | * | 8/2004 | Gerber et al. ................ 60/495 |
| 6,876,094 | B2 | * | 4/2005 | Jacobsen ..................... 290/1 R |
| 6,932,030 | B2 | * | 8/2005 | Perlo et al. ................ 123/46 R |
| 6,984,902 | B1 | * | 1/2006 | Huang et al. .................. 310/26 |
| 6,989,609 | B2 | * | 1/2006 | Marek et al. ................ 290/1 A |
| 7,009,310 | B2 | * | 3/2006 | Cheung et al. .............. 290/1 R |
| 7,009,315 | B2 | * | 3/2006 | Takeuchi ..................... 310/15 |
| 7,148,591 | B2 | * | 12/2006 | Mizoguchi et al. ........... 310/36 |
| 7,161,254 | B1 | * | 1/2007 | Janky et al. ................. 290/1 R |
| 2003/0155827 | A1 | * | 8/2003 | Cheung et al. ............. 310/90.5 |
| 2004/0150277 | A1 | * | 8/2004 | Moriyasu ..................... 310/81 |
| 2005/0093302 | A1 | * | 5/2005 | Miyazaki et al. ............ 290/1 R |
| 2007/0007827 | A1 | * | 1/2007 | Harris et al. .................. 310/15 |
| 2007/0085425 | A1 | * | 4/2007 | Hirashima ................... 310/15 |
| 2007/0188046 | A1 | * | 8/2007 | Chaillout et al. ............. 310/311 |
| 2007/0278902 | A1 | * | 12/2007 | Rastegar et al. ............. 310/339 |
| 2008/0129147 | A1 | * | 6/2008 | Thiesen et al. .............. 310/319 |
| 2008/0136562 | A1 | * | 6/2008 | Kulah et al. ................. 333/186 |

FOREIGN PATENT DOCUMENTS

| | | | |
|---|---|---|---|
| DE | 19929341 A1 | * | 12/2001 |
| GB | 2168481 A | * | 6/1986 |
| GB | 2302456 A | | 1/1997 |
| GB | 2311171 A | * | 9/1997 |
| JP | 60-223466 A | * | 11/1985 |
| JP | 09-093901 A | * | 4/1997 |
| JP | 10066322 | | 3/1998 |
| JP | 11-032471 A | * | 2/1999 |
| JP | 2001-086723 A | * | 3/2001 |
| WO | 02/095908 A1 | * | 11/2002 |
| WO | 03/056691 A1 | * | 7/2003 |
| WO | 2005/069959 A2 | * | 8/2005 |
| WO | 2006/046937 A1 | * | 5/2006 |

OTHER PUBLICATIONS

Sang-Yong Jung; Ho-Yong Choi; Hyun-Kyo Jung; Yang-Seung Choi; Kyu-Man Choi; "Performance evaluation of permanent magnet linear generator for charging the battery of mobile apparatus" Electric Machines and Drives Conference, 2001. IEMDC 2001. IEEE International 2001 pp. 516-521.*

T. Yan, B. E. Jones, R. T. Redowski, M. J. Tudor, S. P. Beeby, N. M. White: "Thick-film PZT-metallic triple beam resonator"; Electronics Letters, vol. 39, No. 13, Jan. 26, 2003, pp. 982-983, XP002332837; p. 982, col. 2, paragraph 2-p. 983, paragraph 5; figure 1.

E. P. James, M. J. Tudor, S. P. Beeby, N. R. Harris, P. Glynne-Jones, J. N. Ross, N. M. White: "An investigation of self-powered systems for condition monitoring applications" Sensors and Actuators, vol. A110, Feb. 1, 2004, p. 172, col. 1, paragraph 2-p. 173, col. 1, paragraph 1, p. 174, col. 2, paragraph 3-p. 175, col. 1, paragraph 1.

M. Mizuno, D. G. Chetwynd: "Investigation of a resonance microgenerator" Journal of Micromechanics and Microengineering, No. 13, Jan. 3, 2003, pp. 209-216, XP002332839, p. 209, col. 2, paragraph 2-p. 210, col. 2, paragraph 3; figures 1-3.

P. D. Mitcheson, T. C. Green, E. M. Yatman, A. S. Holmes: "Architectures for Vibration-Driven Micropower Generators" Journal of Microelectromechanical Systems, vol. 13, No. 3, Jun. 2004, pp. 429-440, XP002332840, p. 429, col. 1, paragraph 2-p. 433, col. 2, paragraph 1, p. 438, col. 1, paragraph 2-p. 439, col. 2, paragraph 6; figures 2-5, 7-9, 27.

* cited by examiner

ELECTROMAGNETIC DEVICE FOR CONVERTING MECHANICAL VIBRATIONAL ENERGY INTO ELECTRICAL ENERGY

The present invention relates to an electromagnetic generator for converting mechanical vibrational energy into electrical energy. In particular, the present invention relates to such a device which is a miniature generator capable of converting ambient vibration energy into electrical energy for use, for example, in powering intelligent sensor systems. Such a system can be used in inaccessible areas where wires cannot be practically attached to provide power or transmit sensor data.

There is currently an increasing level of research activity in the area of alternative power sources for micro electrical mechanical systems (MEMS) devices, such devices being described in the art as being used for 'energy harvesting' and as 'parasitic power sources'. Such power sources are currently being investigated for powering wireless sensors.

It is known to use an electromagnetic generator for harvesting useful electrical power from ambient vibrations. A typical magnet-coil generator consists of a spring-mass combination attached to a magnet or coil in such a manner that when the system vibrates, a coil cuts through the flux formed by a magnetic core. The mass which is moved when vibrated is mounted on a cantilever beam. The beam can either be connected to the magnetic core, with the coil fixed relative to an enclosure for the device, or vice versa.

In a paper entitled "Design and fabrication of a new vibration based electromechanical power generator", by Glynne-Jones et al, published in Sensors and Actuators A92, 2001, pp. 335-342, an electromechanical generator was disclosed consisting of a cantilever beam supported by a housing. A mass on the beam was made up of two magnets mounted on a keeper to form a C-shaped core. A coil was placed in the air-gap between the magnets at right angles to the direction of movement of the mass on the cantilever beam. While this prior disclosure by some of the present inventors produced a useful electromechanical generator, there is still a need to enhance the efficiency of the conversion of mechanical vibration energy into electrical energy, and thereby into useful electrical power.

In a later paper entitled "An electromagnetic, vibration-powered generator for intelligent sensor systems", by P Glynne-Jones, M J Tudor, S P Beeby, N M White, Department of Electronics and Computer Science, University of Southampton, Southampton, SO17 1BJ, Hampshire, England, which was published at a conference entitled "Eurosensors XV1" held in 2002 in Prague, Czech Republic, an improved electromechanical generator was disclosed. The electromechanical generator incorporated four magnets, which created a magnetic field through a greater proportion of the length of each coil winding when compared to double or single magnet designs. The magnets and core structure of the device are illustrated in FIG. 1.

A web page "http://www.iee.org/oncomms/pn/measurement/Steve%20Beeby.pdf" is a copy of a presentation entitled "Kinetic energy harvesting for wireless energy systems" by S P Beeby et al, made at the Institute of Electrical Engineers (IEE) in the United Kingdom at a seminar on "Wheatstone Measurement" held on 11 Dec. 2002. That presentation similarly disclosed the structure and use of an electromechanical generator having the magnet, core and coil construction shown in FIG. 1.

The magnetic core structure, designated generally as 2, in FIG. 1 comprises four magnets 4, 6, 8, 10. Each magnet 4, 6, 8, 10 is substantially block shaped having opposed ends of opposite polarity. The four magnets 4, 6, 8, 10 are disposed in two magnet pairs, with each pair of magnets 4, 6; 8, 10 being assembled with a respective keeper plate 12,14 of ferromagnetic material, for example steel. For each pair of magnets 4, 6; 8, 10, the end of one magnet (for example magnet 4) having a first polarity (for example N for the magnet 4 in FIG. 2) is assembled against the respective keeper plate (for example keeper plate 12 in FIG. 2) and an end of opposite polarity (for example S) of the other magnet (magnet 6 in FIG. 1) is assembled against the same keeper plate (keeper plate 12). The two pairs of magnets 4, 6; 8, 10 are mounted in an opposing manner, with magnet ends 16, 18; 20, 22 of opposite polarity spaced from and facing each other, and with the magnetic flux being guided around the two opposed outside edges of the magnetic core 2 by means of the two keeper plates 12,14, thereby to define a magnetic circuit.

With this arrangement, a single elongate slot 24 is defined between the two opposed magnet pairs 4,6 and 8,10 and there are also defined in the magnetic circuit two air gaps 26,28 therein, each air gap 26,28 being defined between respective opposed magnet ends 16, 18; 20, 22. As shown in FIG. 1, the coil 30 is disposed in the slot 24. The magnetic circuit is mounted on a cantilever beam (not shown), for example a U-shaped member, with each end of the U-shaped member connected to a respective pair of magnets 4, 6; 8, 10. When the electromechanical generator is subject to mechanical vibration, the cantilever beam can correspondingly vibrate, in an up and down direction with respect to the magnetic circuit, as shown by the arrows indicating magnet movement in FIG. 1. This causes an electrical current to be generated in the coil 30.

For each of these latter two prior disclosures made by some of the present inventors, although the disclosed electromechanical generator had a good efficiency, there is still a need to improve the design to enhance the efficiency of electrical power generation from mechanical vibrations.

U.S. Pat. No. 6,304,176 in the name of Rockwell Technologies LLC discloses a parasitically powered sensing device for monitoring an industrial system. A tuned transducer converts stray energy emitted by the system into an electrical potential for consumption by a remote sensing device and/or a wireless communications link. The parasitic transducer may be a piezoelectric crystal element coupled to a tuned mechanical oscillator. Alternatively, the sensing element and transducer may be in the form of a micro-mechanical system. However, no specific magnet, core and coil arrangement is disclosed.

The present invention aims to provide to an improved electromagnetic device for converting mechanical vibrational energy into electrical energy.

The present invention accordingly provides an electromagnetic generator comprising two magnets and a coil disposed therebetween, the two magnets being configured to define therebetween a region of magnetic flux in which the coil is disposed whereby relative movement between the coil and the magnets generates an electrical current in the coil, and a vibratable first mount for each of the magnets and a vibratable second mount for the coil whereby each of the at least two magnets and the coil are respectively vibratable about a respective central position.

The present invention yet further provides an electromagnetic generator comprising first and second coils each disposed between a respective pair of magnets which are configured to define therebetween a region of magnetic flux in which the respective coil is disposed whereby relative movement between the respective coil and the respective magnets generates an electrical current in the respective coil, and wherein the first and second coils each have different respective resonant frequencies when vibrated relative to their respective magnets.

Embodiments of the present invention will now be described by way of example only with reference to the accompanying drawings, in which.

Figure 1:
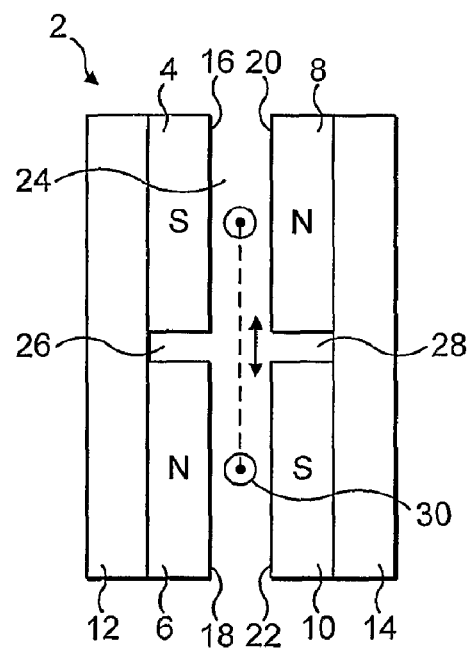
FIG. 1 is a schematic side elevation of a configuration for the magnets, core and coil of a known electromagnetic device for converting mechanical vibrational energy into electrical energy.
Figure 2:
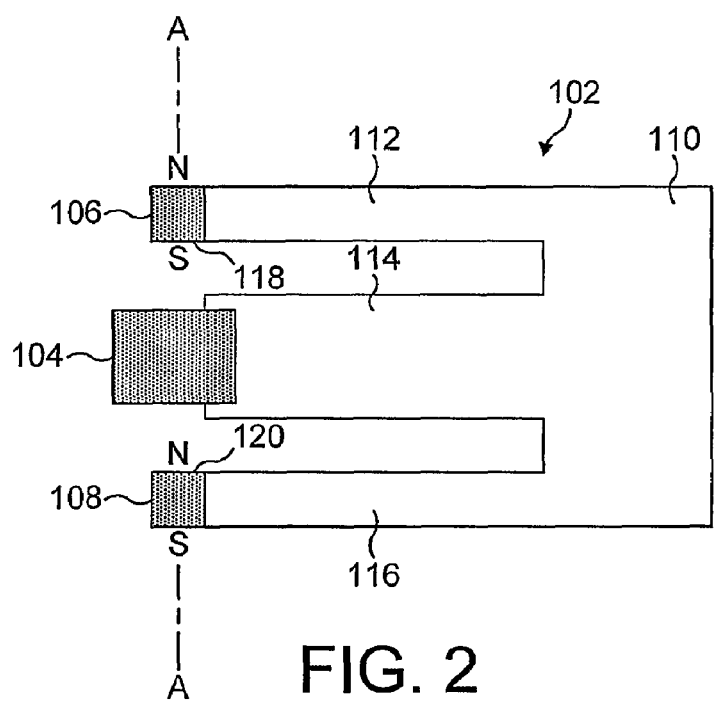
FIG. 2 is a schematic side elevation of an electromechanical generator in accordance with a first embodiment of the present invention.

FIG. 2 shows an electromechanical generator in accordance with a first embodiment of the present invention. In this embodiment, a resonating structure, designated generally as 102, is provided on which a coil 104 is mounted between a pair of opposed magnets 106, 108. The poles of the magnets 106, 108 which face the coil 104 are of opposite polarity (in FIG. 1 the upper magnet 106 has a south pole S facing the coil 104 and the lower magnet 108 has a north pole N facing the coil 104). The resonating structure 102 comprises a base 110 from which extend three elongate beams 112, 114, 116 which are parallel and coplanar. The base 110 and the three elongate beams 112, 114, 116 are integral. The three elongate beams 112, 114, 116 typically have a square or rectangular cross-section. The coil 104 is mounted on a centre beam 114 and a respective magnet 106, 108 is mounted on each of the two outer beams 112, 116. The coil 104 and magnets 106, 108 are mounted at a free end of the respective beam 114 and 112, 116. The magnets 106, 108 are mounted so that the two magnet faces 118, 120 facing the coil 104 have opposite polarity, as stated above. In this way, the coil 104 is mounted in the magnetic flux extending between the two opposed magnets 106, 108.

In the rest position, as shown in FIG. 2, the two magnets 106, 108 and the coil 104 are all aligned along a common axis A-A, orthogonal to the length of the three beams 112, 114, 116. The windings (not shown) of the coil 104 are orthogonal to this axis A-A and the coil 104 is connected to wires (not shown) which in use deliver electrical current generated in the coil 104 by relative movement of the coil 104 and the magnets 106, 108 so that electrical energy may be harvested by such movement.

The centre beam 114 has a mass which is substantially the same as that of the two outer beams 112, 116 combined, which have equal mass. In other words, the mass of each outer beam 112, 116 is substantially one half of the mass of the centre beam 114.

Preferably, to improve the degree of coupling, it is desirable to choose a type of magnet 106, 108 that will produce a strong flux density. Rare earth magnets are ideal for this application, and offer up to 5 times the magnetic energy density of conventional Alnico magnets. Neodymium Iron Boron (NdFeB) magnets have the most powerful magnetic properties per cubic cm known at this time, and can operate at up to 120° C. If higher temperature operation is required, the less powerful Samarium Cobalt can be used, with a working temperature of up to 250° C.

However, in accordance with the present invention it is alternatively possible for the magnets to be produced by depositing, for example by printing, magnetic material onto the respective beams rather than attach preformed magnets to the beams. This is particularly applicable to miniaturised devices, and can lower the production cost by using known batch fabrication processes to form layers on a substrate which is to form the integral base and beams.

The integral base and beams may be composed of a metal or metal alloy, or a semiconductor such as silicon.

The coil 104 is characterised by the proportion of the coil that passes through the magnetic field, the number of turns in the coil, and its series resistance. Second-order effects such as coil inductance can often be ignored due to the low frequency of many applications. Two types of coil may be used in the present invention: wound coils, and printed coils.

A printed coil can be formed by screen-printing layers of conductive materials and insulators onto a substrate in much the same manner as printed circuit boards (PCBs) are produced. A printed coil can be made very thin as printed layers will typically be 10 μm thick, making this approach particularly attractive for small-scale devices. A printed coil may also be easier to manufacture as it only involves standard thick-film printing processes, as opposed to a wound coil, which becomes more difficult to manufacture particularly as the scale decreases. The disadvantage of a printed coil is that the small thickness of each layer will result in a high series resistance for the coil. If windings of a larger thickness than are traditionally available from thick-film technology (e.g. >50 μm) are required a wound coil will be more suitable and economic to manufacture. Printed coils have the added advantage of already being attached to a substrate, which may add rigidity to the coil, and hence decrease the clearance required between the coil and the magnets of the outer layers. Additionally the coil may be formed by lithographic processes such as are those used to define structures on a silicon wafer in the technical field of micro-engineering. These processes are well known in the prior art and successive layers can be built up by a variety of processes such as sputtering, evaporation or electroplating and are not limited to deposition on silicon wafers but can be applied to any wafer like substrate.

In use, the base 110 is mounted at a single mounting point to a host device (not shown) from which energy is to be harvested as a result of vibration of the host device. In this way, the inertial force produced by the vibration of the host is effectively applied to the electromechanical generator at that mounting point. The electromechanical generator is mounted on the host device so as to achieve a most preferred mode of vibration, which is that the three beams 112, 114, 116 vibrate out of the plane of the resonating structure 102 (i.e. out of the plane of the drawing of FIG. 2). The beams 112, 114, 116 vibrate therefore in a manner similar to the tines of a triple beam double ended tuning fork. Most preferably, the vibration of the beams 112, 114, 116 is in a preferred resonant mode so that the vibration of the coil 104 on the centre beam 114 is in antiphase to that of each of the two magnets 106, 108 mounted on the outer beams 112, 116 (i.e. the phase difference between the coil 104 and the magnets 106, 108 is 180°). This antiphase vibrational relationship between the coil 104 on the one hand and the magnets 106, 108 (and thus the magnetic flux) on the other hand thereby allows maximum relative displacement of the coil 104 and the magnets 106, 108 and thus maximum cutting of the magnetic flux by the movement of the coil 104 relative to the magnets 106, 108.

In alternative embodiments which are modifications of the embodiment of FIG. 2, the coil and/or the magnets may be mounted at other points on the beams, other than at the beam ends, and additionally or alternatively the magnets may be mounted on the centre beam and coils may be mounted on the two outer beams. In a further modification, links or stiffening members may be additionally incorporated on or between the beams carrying the magnets in order to stiffen those beams, thereby to oppose the mutually attracted force of the two magnets and stop the beams from being distorted or damaged.

In the known device of FIG. 1, the magnets and the coil are required to be mounted to respective elements (the magnets to a common cantilever element and the coil to a fixed element). The requirement for two such mounting elements complicates the installation of the electromagnetic generator on the host device. In contrast, the electromagnetic generator of the present invention provides a common mount, namely the base, for all the magnets and coil(s), and such a single mount can more readily be attached to the host device in a simple manner.

Figure 3:
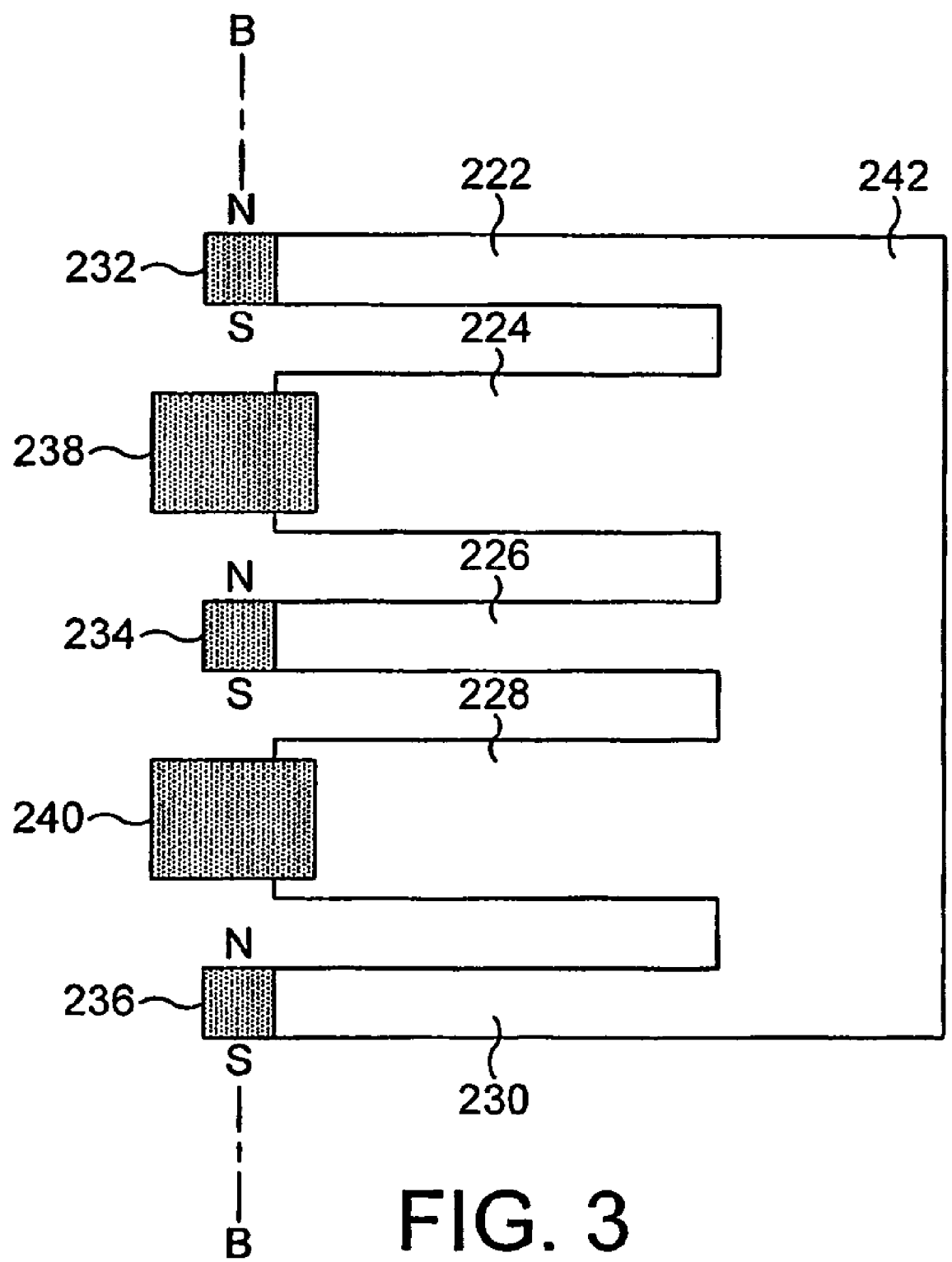
FIG. 3 is a schematic side elevation of an electromechanical generator in accordance with a second embodiment of the present invention.

A further embodiment of an electromechanical generator in accordance with the present invention is illustrated in FIG. 3. This embodiment is a modification of the previous embodiment, in that five beams 222, 224, 226, 228, 230 extend from a common base 242. The beams 222, 224, 226, 228, 230 define a linear and coplanar array of beams 222, 224, 226, 228, 230 and respective magnets 232, 234, 236 are mounted at the end of each of the first, third and fifth beams 222, 226, 230 and a respective coil 238, 240 is mounted at the end of each of the second and fourth beams 224, 228. The magnets 232, 234, 236 and coils 38, 240 are mounted coaxially along a common axis B-B, with each coil 238, 240 being located between opposed magnet poles of opposite polarity.

Again, when the electromagnetic generator is mounted via the base 242 to a host device (not shown), when the host device is subject to mechanical vibration, this vibration is transmitted to the five beams 222, 224, 226, 228, 230 of the electromechanical generator which vibrate in a manner similar to the tines of a triple beam double ended tuning fork, namely out of the plane of the resonating structure (and the plane of the drawing of FIG. 3). In the chosen mode of vibration the beams 222, 226, 230 carrying the magnets 222, 226, 230 and the beams 224, 228 carrying the coils 224, 228, as described above for the first embodiment, the two beams 224, 228 carrying the coils 24, 228 vibrate in phase with each other, and in anti-phase with the three beams 222, 226, 230 carrying the magnets 222, 226, 230. Again, this maximises the cutting of the magnetic flux by the coils 224, 228 for a given vibration amplitude and frequency.

The embodiment of FIG. 3 may be modified so as to provide a different resonant frequency for each of the two coil/magnet combinations. Such difference resonant frequencies may in any event occur as a result of normal production tolerances, but preferably such a resonant frequency difference is deliberately provided in the device, for example by modifying the mass of the beams, in particular by attaching additional mass to the beams, (for example by selection of the mass of the magnets and/or the coils), and/or by modifying the beam dimensions, such as the cross-sectional area and/or beam length. This provision of plural resonant frequencies in a single electromechanical generator correspondingly broadens the frequency range over which electrical energy can be generated.

The embodiment of FIG. 3 may be further modified so as to provide additional beams carrying magnets or coils so as to provide any number of beam "fingers" whilst preserving a linear array.

This embodiment permits the mounting of multiple magnets and multiple coils in a structure requiring a small geometric volume and area, yet increases the efficiency of the generation of electrical current by the provision of multiple coil/magnet combinations. A common magnet (in this embodiment the magnet on the third beam) is shared between the two coil/magnet combinations.

Figure 4:
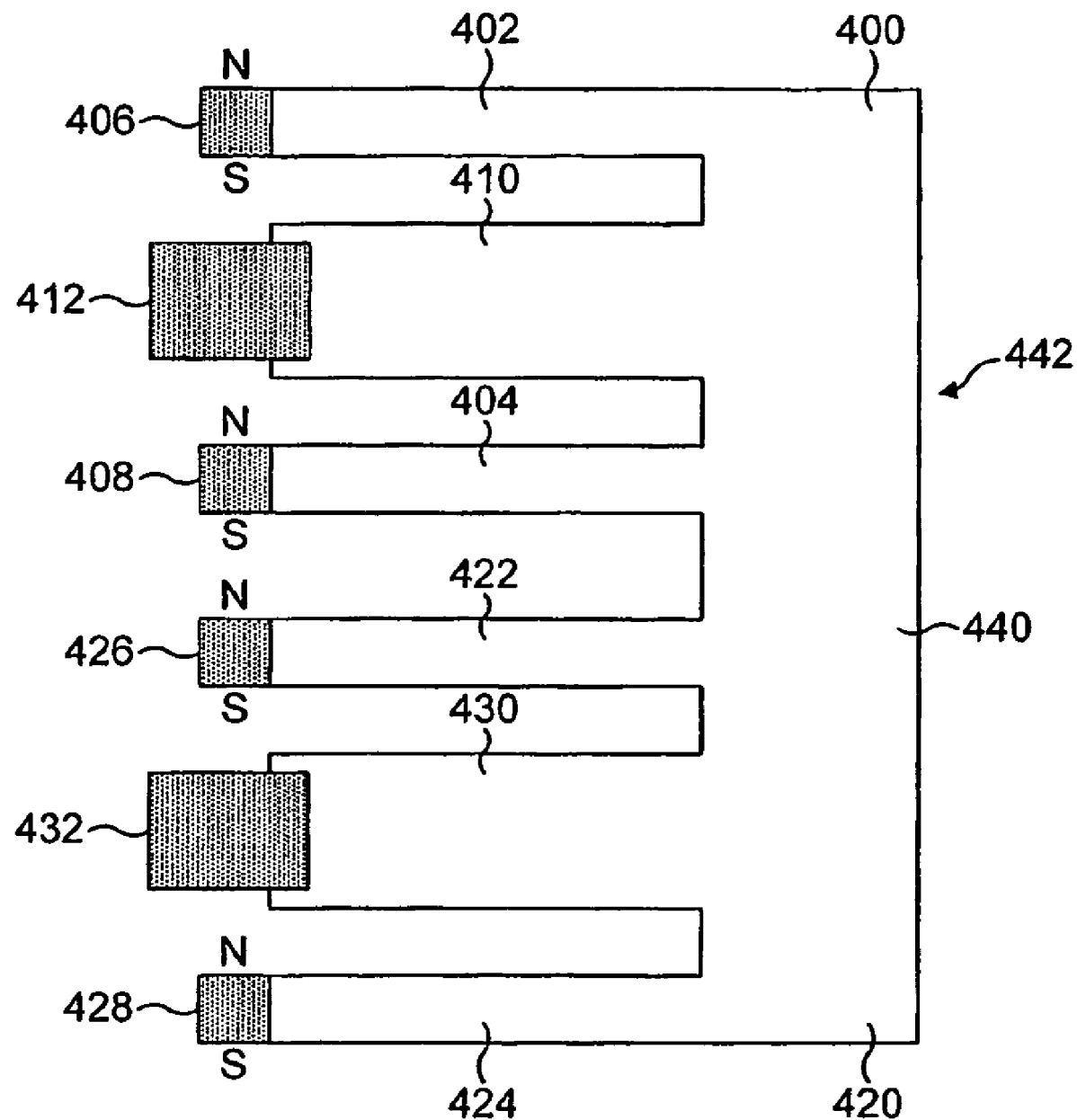
FIG. 4 is a schematic side elevation of an electromechanical generator in accordance with a third embodiment of the present invention.

The multiple coil embodiment of FIG. 3 may be modified so as to enhance the provision of multiple resonant frequencies, one for each coil, in the single electromagnetic generator. The modification consists of decoupling of the resonating structures, by avoiding the provision of a common vibratable beam shared between adjacent resonating structures. Therefore as shown in FIG. 4, an additional beam may be provided between the two coils, so that each beam of the pair is associated with a respective resonating structure. FIG. 4 shows a further embodiment comprising a six beam structure consisting of two, three beam structures each of which has a slightly different resonant frequency. Effectively, two independent electromechanical generators are provided in a common device since the structures are decoupled from each other to avoid them having a single resonant mode. A first resonant structure 400 consists of two outer beams 402, 404 each carrying a respective magnet 406, 408 and a central beam 410 carrying a coil 412. A second resonant structure 420, adjacent to the first, consists of two outer beams 422, 424 each carrying a respective magnet 426, 428 and a central beam 430 carrying a coil 432. The first and second resonant structures 400, 420 are integral with a common base 440 to constitute a single electromagnetic generator 442. The first and second resonant structures 400, 420 are coplanar, but this is not essential, and the respective three beam structures may extend in different or opposite directions. In addition, more than two decoupled resonating structures may be provided in further modifications in accordance with the invention.

Figure 5:
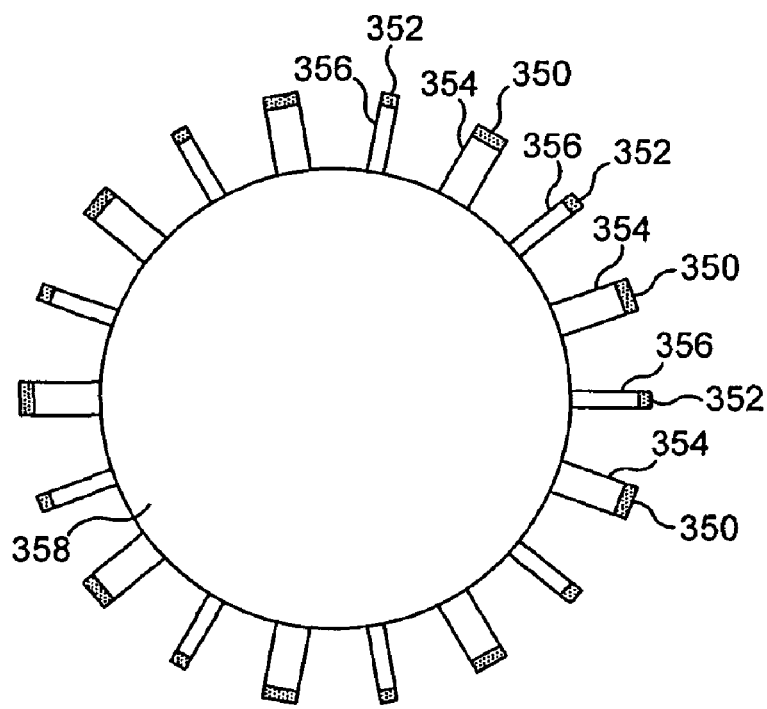
FIG. 5 is a schematic side elevation of an electromechanical generator in accordance with a fourth embodiment of the present invention.

A further embodiment of an electromagnetic generator in accordance with the present invention is illustrated in FIG. 5. In this embodiment, a succession of coils 350 and magnets 352 are mounted on the end of respective beams 354, 356 in an alternating configuration around a common central base 358 having a geometrical shape, which may, as in the illustrated embodiment, for example be a circle. The beams 354, 356 extend radially outwardly from the base 358, which in use is mounted on the host device (not shown) from which energy is to be harvested. Every other beam 354 has mounted thereon a respective coil 350 and the remaining beams 356 have mounted thereon a respective magnet 352, with the magnets 352 being mounted so that each coil 350 is disposed between opposed magnetic faces of opposite polarity. The coils 350 and magnets 352 are mounted around a circular line of common radius, by the beams 354, 356 having a common length.

By providing multiple coil/magnet combinations, as described above with the previous embodiment, this permits the possibility of slightly different resonant frequencies for each coil and magnet unit. This offers a broader frequency band which is responsive to vibrations from the host. Again, each coil 350 is arranged to vibrate on its respective beam 354 substantially in anti-phase with its corresponding magnets 352 which are themselves mounted on respective beams 356.

As for the embodiment of FIG. 4, additional beams may be provided to decouple each resonating structure, consisting of a coil between a pair of magnets, from its neighbouring resonating structure(s).

In this embodiment, a circular geometry for the electromagnetic generator makes the most efficient use of space and magnets. However, the beams may equally well be arranged in another polygonal shape, such as a square, rectangular or indeed any geometric shape.

Figure 6:
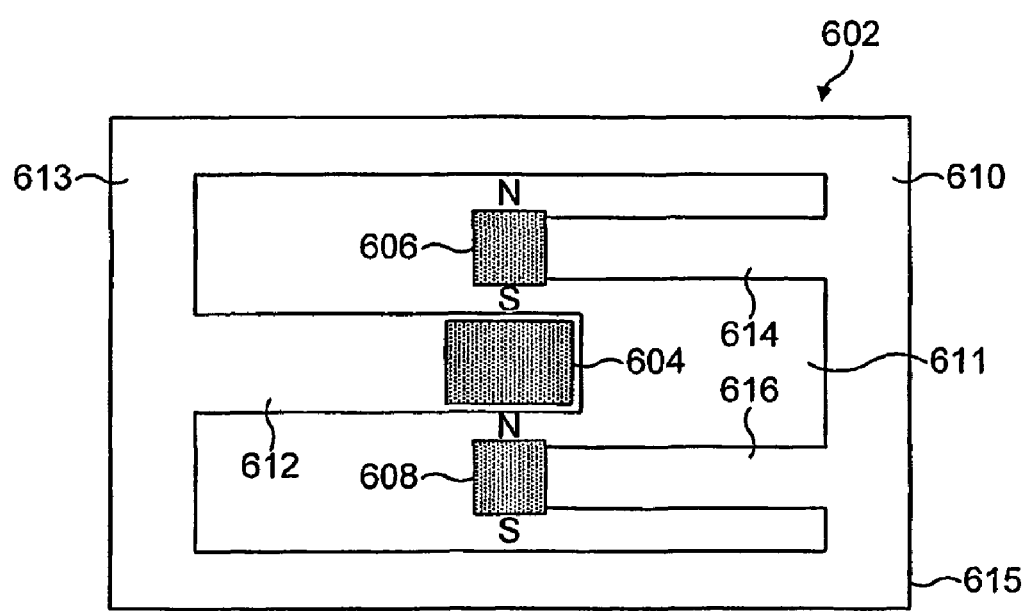
FIG. 6 is a schematic side elevation of an electromechanical generator in accordance with a fifth embodiment of the present invention.

A further embodiment of an electromagnetic generator in accordance with the present invention is shown in FIG. 6. In this embodiment the base 610 is annular, more particularly rectangular in shape, and defines a central opening 611. The base 610 supports a first finger 612, carrying a coil 604, extending away from one edge 613 of the base 610 into the central opening 611 and two second fingers 614, 616, each carrying a respective magnet 606, 608, extending away from the opposite edge 615 of the base 610 into the central opening 611. The fingers 612, 614, 616 are substantially coplanar and substantially equal in length so that the coil 604 is disposed between the magnets 606, 608.

Figure 7:
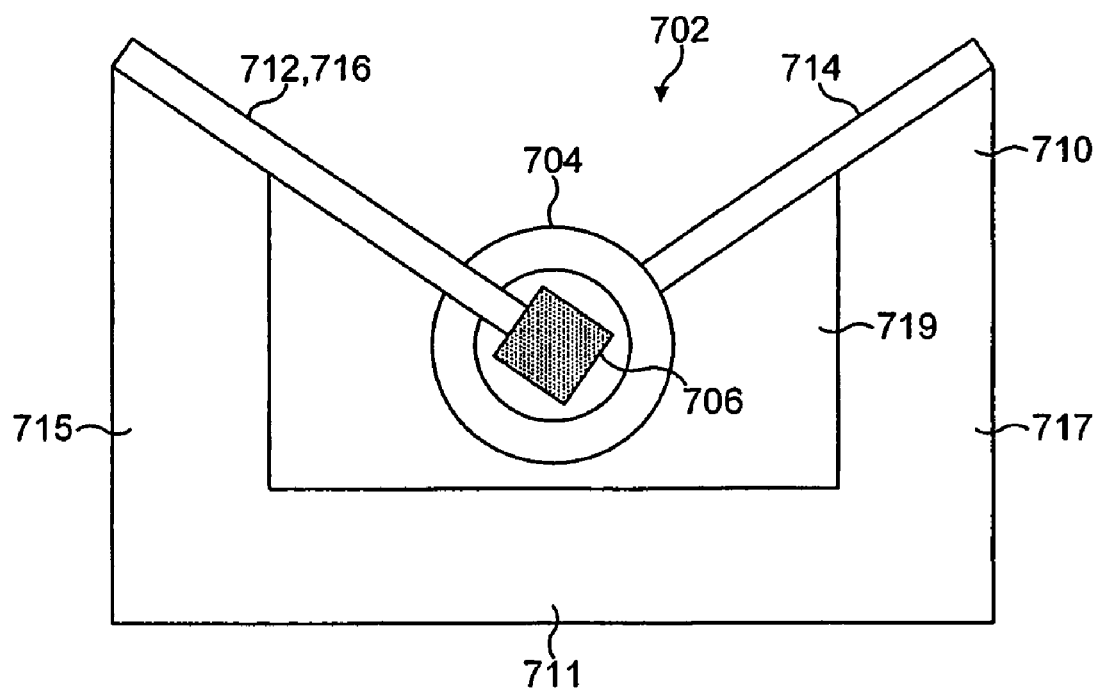
FIG. 7 is a schematic plan view of an electromechanical generator in accordance with a sixth embodiment of the present invention.
Figure 8:
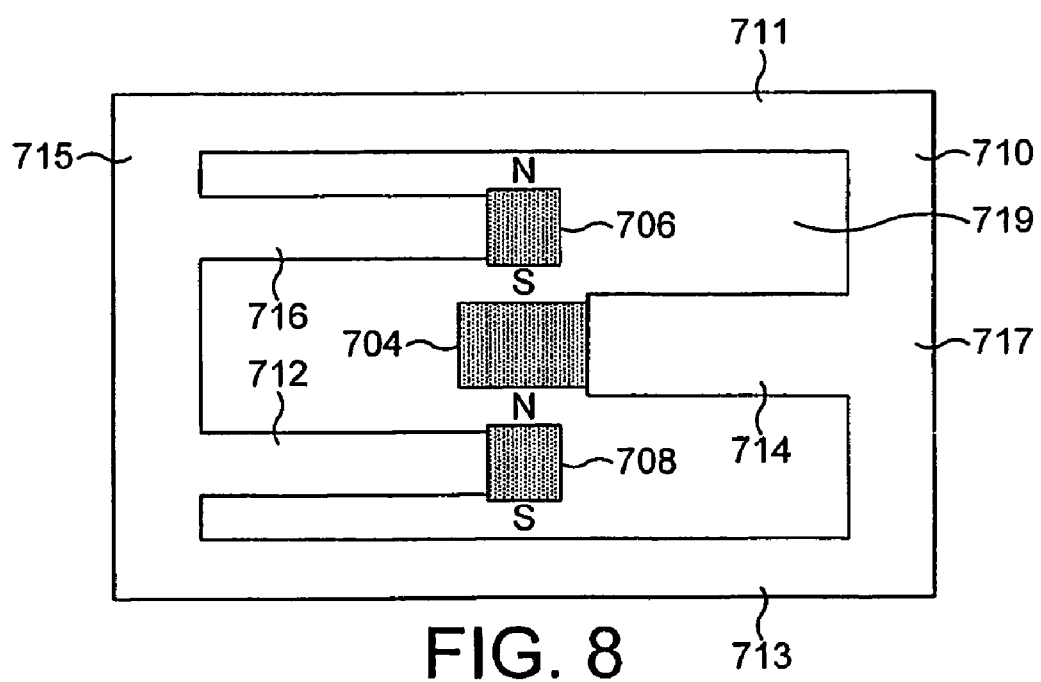
FIG. 8 is a schematic side elevation of the electromechanical generator of FIG. 7.

A further embodiment of an electromagnetic generator in accordance with the present invention is shown in FIGS. 7 and 8. In this embodiment the base is three dimensional, and the fingers supporting the magnets and the coil are not coplanar. The base 710 comprises a central part having upper and lower sides 711, 713 connected at their opposed ends by respective uprights 715, 717. In elevation, the base 710 is annular, more particularly rectangular, in shape. In plan, the base 710 is substantially U-shaped, with the uprights 715, 717 at free ends of the base 710, and a central cavity 719 is defined between the uprights 715, 717 and the upper and lower sides 711, 713. One upright 717 supports a first finger 714, carrying a coil 704, extending away from the upright 717 and the other upright 715 supports two second fingers 714, 616, each carrying a respective magnet 706, 708, extending away from the upright 715. The fingers 712, 716 are substantially coplanar and substantially equal in length, and the finger 714 is substantially the same length as the fingers 712, 716 so that the coil 704 is disposed between the magnets 706, 708. In this particular embodiment the fingers 712 and 716 are parallel to each other, but not parallel to the finger 714. The fingers 712, 716 are inclined at an acute angle, typically from 30 to 45 degrees, to a plane orthogonal to the upper and lower sides 711, 713, and the finger 714 is correspondingly inclined, but in an opposite orientation. In this way, the magnets 706, 708 and the coil 704 are all received within the central cavity 719 defined between the uprights 715, 717 and the upper and lower sides 711, 713. The direction of vibration is in the plane of the drawing in FIG. 7 and substantially out of the plane of the drawing in FIG. 8.

For efficient energy conversion, in the embodiments of the invention the beams carrying the magnets and the coils(s) are excited at a resonant frequency. This resonant frequency is sensitive to beam amplitude and environmental temperature. It is also desired to determine the maximum beam amplitude that should be allowed to prevent damage through over straining the beam material. Preferably, the design includes a vacuum-sealed housing so that a vacuum surrounds the entire device.

In the illustrated embodiments, although each block-shaped magnet having a longitudinal direction extending between the ends of opposite polarity of the magnet is shown to have a rectangular transverse cross-section, the cross-section may be varied, for example by providing a circular cross-section.

This invention therefore generally provides a resonating structure on to which a coil and magnet combination, or plural coil and magnet combinations, can be mounted. The coils and magnets can have simple single magnet or double magnet structures, or more complicated multiple magnet structures. The invention also provides a resonating structure which is mounted at a single point on the host so the inertial force produced by the vibration is effectively applied at this mounting point. It also provides a structure with greater ease of mounting than the prior art since in the prior art the magnet and coil must be mounted independently. This present invention provides a single mounting point for the magnets and coil.

In the preferred mode of resonance the vibration of the coil is in anti-phase to that of the magnets allowing maximum relative displacement and maximum flux cutting to take place. The present invention provides a means of moving the coil in anti-phase with the magnets so as to provide a greater relative velocity between the magnets and the coil. By incorporating multiple cantilevers, this allows the possibility of having slightly different resonant frequencies for each coil and magnet unit cell thus offering a broader band response to vibrations. It also provides a means of extending the structure to allow the mounting of multiple magnets and coils in a small geometry. This structure provides a means of widening the frequency range over which energy can be generated by incorporating multiple resonances within a single structure. Indeed this effect may occur naturally due to normal production tolerances.

Although tuning forks have been well known for many years, and also vibrating beams are known for use in devices such as force sensors, the inventors believe that the use in electromechanical generators of vibration devices having a structure similar to tuning forks but additionally to which both the magnets and the coil(s) are mounted for vibration at a resonant frequency is not known in the art.

In accordance with a preferred aspect of the invention, by employing wafer processing and thick film technology to produce a miniature electromagnetic generator, the device can readily be batch fabricated, thus achieving low production cost. Furthermore, such devices are readily miniaturised, yet have high reliability as a result of using known production steps which are readily controllable.

The electromechanical generator of the present invention has particular application in the provision of electrical power to sensor systems. In accordance with the invention, typical application areas for such self powered intelligent sensor systems are: inside or on the body (e.g. human, animal); on rotating objects; within liquids such as molten plastic or setting concrete; structural monitoring such as within bridges, buildings, aircraft or roads; and environmental monitoring, such as pollution monitoring in fields.

The electromagnetic generator in accordance with the present invention has a number of potential uses and applications, particularly when miniaturised. For example, the electromagnetic generator is really useful in applications where cabling to a unit (e.g. a sensor unit) requiring electrical power is difficult and/or expensive and battery power is insufficient in the life of the unit, weight is important and from which there is a significant level of vibration available to harvest power. In some cases the vibration harvesting technology of the electromagnetic generator may be used to provide a charging facility to a battery powered system.

In one particularly preferred application, the electromagnetic generator of the present invention may be incorporated into Health and Usage Monitoring Systems (HUMS) for helicopters and fixed wing aircraft.

HUMS systems monitor vibration and other parameters related to helicopter (or other aircraft) condition and the number of hours flying in defined stress conditions. The installation of sensors and retrieving data from those devices is a major cost issue both at installation and also during planned maintenance. The benefits of the electromagnetic generator of the present invention are reduced installation costs and shorter time taken for maintenance. The sensor would be packaged with a local wire less transmission system and would transmit data to the HUMS monitoring system. Some advantages of using the electromagnetic generator powered sensor system are that the complexity of installing wiring on existing or new airframes is avoided and the weight of the cabling is eliminated. Also monitoring sensors can be mounted for short trial periods without high installation costs.

In another particularly preferred application, the electromagnetic generator of the present invention may be incorporated into sensing systems for railway lines and associated components.

The condition of railway lines and associated components is a matter of concern within the UK and probably throughout the world. It is known to provide sensor systems for sensing for rail condition and also the presence/absence of vital components. In some situations there is adequate local electrical power for driving a sensor. However, in other situations local electrical power may be unavailable or inconvenient, particularly for remote or distant sites, in which case there is a need for a self-powered sensor (e.g. a strain sensor) that could telemeter the output data to a single powered point (one for a large geographical area) or via a GPS link. The vibration for the sensor may be provided by the passage of a train, either directly from the rail line or via a cantilever attached to the line. Other railway infrastructure monitoring includes, for example, strain measurement in rails, ballast condition and height, and points monitoring.

In a yet further particularly preferred application, the electromagnetic generator of the present invention may be incorporated into a vehicle battery charger system, for example for lorry or truck trailers tracking battery recharging.

Articulated trailers need to be tracked for logistics applications. In this application the trailer is only powered when the trailer is connected to a tractor unit. Even then there may be no power available for a retrofitted tracking system. If the system is powered by a battery it would be an advantage to have an independent charging system that would charge the battery whilst the system was being towed. The charging system may incorporate the electromagnetic generator of the present invention. The battery would then be able to power the tracking system while the trailer was stationary and disconnected from the tractor unit.

In a still further particularly preferred application, the electromagnetic generator of the present invention may be incorporated into a mobile telecommunications equipment, for example military backpack telecommunications equipment (e.g. Bowman), which is powered by a battery. Batteries contribute to a significant proportion of the overall weight of the equipment carried in the field. Clearly during field operation the equipment is subjected to considerable vibration. These vibrations could be transformed by the electromagnetic generator of the present invention into electrical power that is suitably conditioned for use in recharging the battery packs. The electromagnetic generator of the present invention can reduce the weight and maintain the power available of the telecommunications equipment, thereby providing real benefits to the user.

In other preferred applications, the electromagnetic generator of the present invention may be incorporated into a conditioning monitoring system which is increasingly used in a very wide field for many types of equipment. For example, the electromagnetic generator of the present invention may be used to power a vibration condition-monitoring sensor on any type of equipment.

The invention claimed is:

1. An electromagnetic generator comprising two magnets and a coil disposed therebetween, the two magnets being configured to define therebetween a region of magnetic flux in which the coil is disposed whereby relative movement between the coil and the magnets generates an electrical current in the coil, and a vibratable first mount for each of the magnets, a vibratable second mount for the coil, and a common mount, whereby each of the magnets and the coil are respectively vibratable relative to the common mount about a respective central position, wherein the vibratable first mount and the vibratable second mount are adapted to vibrate out of phase when excited to vibrate by a common input of vibration energy, so that the coil and its respective magnets vibrate out of phase with each other.

2. An electromagnetic generator according to claim 1 wherein the vibratable first mount and the vibratable second mount are adapted to vibrate substantially in anti-phase when excited to vibrate by a common input of vibration energy, so that the coil and its respective magnets vibrate substantially in anti-phase with each other.

3. An electromagnetic generator according to claim 1 wherein each of the vibratable first mount and the vibratable second mount comprises a cantilever beam, and the cantilever beam of each vibratable first mount has substantially one half of the mass of the cantilever beam of the vibratable second mount.

4. An electromagnetic generator according to claim 3 wherein the cantilever beam of each vibratable first mount is substantially the same length as the cantilever beam of the vibratable second mount.

5. An electromagnetic generator according to claim 3 wherein each magnet is mounted at a free end of the cantilever beam of each vibratable first mount and the coil is mounted at a free end of the cantilever beam of the vibratable second mount.

6. An electromagnetic generator according to claim 1 wherein each of the vibratable first mount and the vibratable second mount extend from the common mount.

7. An electromagnetic generator according to claim 6 wherein each of the vibratable first mount and the vibratable second mount are integral with the common mount.

8. An electromagnetic generator according to claim 1 wherein the at least two magnets and the coil are mounted along a common axis.

* * * * *